United States Patent [19]

Senior et al.

[11] 4,378,463

[45] Mar. 29, 1983

[54] EPIHALOHYDRIN POLYMER COMPOSITION

[75] Inventors: John M. Senior; Linda E. Abrams, both of Swindon, England

[73] Assignee: Raychem Limited, London, England

[21] Appl. No.: 286,646

[22] Filed: Jul. 24, 1981

Related U.S. Application Data

[63] Continuation-in-part of Ser. No. 126,521, Mar. 3, 1980, abandoned, which is a continuation of Ser. No. 845,305, Oct. 25, 1977, abandoned.

[30] Foreign Application Priority Data

Oct. 29, 1976 [GB] United Kingdom .............. 45036/76

[51] Int. Cl.$^3$ ..................... H02G 15/08; H02G 15/02
[52] U.S. Cl. .................................. 174/73 R; 428/355; 428/377; 28/379; 524/409; 524/430; 524/431; 524/441; 524/449; 524/451; 524/502; 524/541
[58] Field of Search ..................... 428/355, 377, 379; 174/73 R, 73 SC; 260/37 AL, 38; 427/117, 118; 525/187, 403, 405; 524/430, 431, 449, 409

[56] References Cited

U.S. PATENT DOCUMENTS

| | | | |
|---|---|---|---|
| 3,349,164 | 10/1967 | Wyatt | 174/73 |
| 3,479,204 | 11/1969 | Lovelock et al. | 427/118 |
| 3,732,174 | 5/1973 | Nicholas | 260/2 A |
| 3,808,288 | 4/1974 | Hackhel | 260/37 AL |
| 3,870,552 | 3/1975 | Hackhel | 260/37 AL |

FOREIGN PATENT DOCUMENTS 2132338 11/1972 France .
2156293 5/1973 France .
1434719 5/1976 United Kingdom .

OTHER PUBLICATIONS

I. Skeist, ed.; *Handbook of Adhesives*, (1962), pp. 189, 199.
C. V. Cagle, ed.; *Handbook of Adhesive Bonding*, (1972), pp. 16-1, 16-10.
B. F. Goodrich Chemical Co.; Sales Service Report INT 6-68; "Currently Available Basic Information on the Use of HYDRIN 100 in Adhesives", (May 1968).

*Primary Examiner*—Lewis T. Jacobs
*Attorney, Agent, or Firm*—Lyon & Lyon

[57] ABSTRACT

A composition based on epihalohydrin elastomers comprises from 12 to 125 parts, preferably from 25 to 75 parts, of a suitable tackifier, and from 25 to 150 parts, preferably from 30 to 100 parts, of a particulate filler per 100 parts by weight of elastomer. The tackifier contains polar moieties for compatibility with the elastomer and is preferably a phenolic, modified phenolic, coumarone-indene or polyketone resin. The filler is preferably an inorganic material such as alumina trihydrate, silica, or iron oxide. These composition have useful adhesive and surprising stress-grading properties and are thus suitable for use with heat-recoverable articles in the terminatiion, connection, and encapsulation of high voltage electrical apparatus.

22 Claims, No Drawings

EPIHALOHYDRIN POLYMER COMPOSITION

CROSS-REFERENCE TO RELATED APPLICATIONS

This application is a continuation-in-part of our copending application, Ser. No. 126,521, filed Mar. 3, 1980 now abandoned, which is itself a continuation of our application, Ser. No. 845,305, filed Oct. 25, 1977, now abandoned. The disclosures of these applications are incorporated herein by reference.

This invention relates to epihalohydrin polymer compositions which are especially suitable for use in heat-recoverable products, and as sealants and void fillers in areas of high electrical stress.

The use of adhesives for bonding plastic compositions to other plastic compositions of the same or a different type or to metals is of course well known. In particular, heat-activated adhesives are widely used in bonding plastics sleeves and end caps to power cables or conduits or to various types of metal or plastic pipe or tubing.

In recent years increasing attention has been paid to the use of heat-recoverable articles for these applications. Heat-recoverable articles, especially heat-shrinkable articles, are now widely used in many areas where insulation, sealing and encapsulation are required. Usually these articles recover, on heating, towards an original shape from which they have been previously deformed but the term "heat-recoverable" as used herein also includes an article which, on heating, adopts a new configuration, even if it has not been previously deformed.

Heat-recoverable articles are typically made from polymeric materials exhibiting the property of plastic or elastic memory as described, for example, in U.S. Pat. Nos. 2,027,962 and 3,086,243. In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Generally, provision is made for adhesive bonding between the heat-recoverable article and the substrate about which it is recovered, but in certain cases the nature of the substrate has precluded the formation of suitable bonds with most of the adhesives heretofor available. For example, great difficulty has been experienced in bonding heat-recoverable articles to certain fluorine-containing polymers, in particular copolymers of olefins and fluorine-substituted olefins, and to certain silicone elastomers. Conventional heat-activatable adhesives frequently afford peel strengths to such substrates of less than about 1 pound per linear inch at room temperature. Further requisites of heat-activatable adhesives for use with heat-recoverable articles are that their reactivation temperature should be in the same range as or lower than, the recovery temperature (which is typically in the range of from 90° C. to 170° C.) so that they can be reactivated simultaneously with recovery and that they should have good flow properties, consistent with the requirement that the viscosity of the adhesive should be sufficient to retain it in contact with the heat-recoverable article if the configuration thereof is such that it would otherwise flow therefrom. In addition to the above, it is desirable in many instances that the adhesive should be substantially non-tacky at room temperature in order to permit easy handling of the adhesive coated heat-recoverable articles, and that the adhesive bond should be able to withstand prolonged periods of applied stress.

The present invention provides a composition comprising:
(a) 100 parts by weight of an elastomeric epihalohydrin polymer comprising recurring units having the formula:

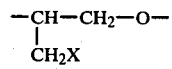

where X is a halogen atom;
(b) from 12 to 125 parts by weight of a tackifier; and
(c) from 25 to 150 parts by weight of a particulate filler.

The present invention provides a method of providing relief against electrical stress in a region liable to be affected, such for example, as a region around a high voltage termination or splice, wherein voids present in the region concerned are filled with a sealant composition as defined above. This will be discussed in more detail below.

One preferred use of the compositions of the present invention is in applications using heat-recoverable products.

Compositions according to the present invention may be prepared by selecting an appropriate combination of a tackifier and a particulate filler and blending the elastomeric epihalohydrin polymer therewith. The particulate filler is present in an amount of from about 25 to 150 parts by weight per 100 parts of elastomeric epihalohydrin polymer.

The compositions of the present invention act as adhesives, mastics and sealants to provide stress relief in high voltage (greater than 1 KV, usually greater than 10 KV) terminations and joints and in other situations where electrical apparatus may be subjected to high voltage stress.

This stems from our observation that, apart from exhibiting desirable adhesive and flow properties, it is possible to formulate compositions which have very surprising electrical properties. For example, a typical composition comprising 200 parts by weight epichlorohydrin polymer, 60 parts alumina hydrate filler and 140 parts polyketone tackifier has the following properties:

| Permittivity | 4 to 12 |
|---|---|
| Tan Δ | <0.1 |
| Volume Resistivity | >10$^9$ ohm cm. |

It will be appreciated that these properties make such a composition exceedingly useful as a sealant to fill voids in regions of high electrical stress and, in some cases, the use of such a sealant may obviate the need for other particulate stress-grading materials.

Amongst applications in which these properties may be utilized there may be mentioned, for example, the terminations and splices described in British Pat. Nos. 1,434,719 and 1,470,503. The compositions of the present invention may be used together with or in place of, the heat-recoverable articles and non-linear fillers described and claimed, respectively, in those patents.

In general, it may be said that the compositions of the present invention act to relieve electrical stress by filling voids in which corona discharge might otherwise occur. Amongst regions in which such voids appear there may be mentioned, for example, the space around a crimped or sweated connection in a high voltage cable splice, e.g., in an 11 KV mass impregnated oil-filled cable, or around the end of a screened termination of 15 or 20 KV cross-linked polyethylene insulated shielded cable. In this respect it should be mentioned that the compositions of the present invention show markedly superior stress-grading properties under temperature cycling at over voltage stresses than previously used materials such as polyisobutylene mastics or silicone based grease compositions.

Amongst the other properties of the compositions which contribute to this important field of application, there may especially be mentioned:
(a) their high adhesion to a variety of substrates; and
(b) their ability to flow smoothly under the recovery forces of, for example, heat-shrinkable tubing.

The compositions may therefore be applied as a coating on a heat-recoverable article or in the form of a tape which is wrapped around the region concerned or may be simply applied per se, e.g., by painting on from solution. It will be appreciated that the stress grading function will in many cases be combined with an adhesive or sealing function.

Epihalohydrin polymers suitable for use in the compositions of the present invention are the elastomeric polymers of an epihalohydrin, for example, epichlorohydrin, or epibromohydrin, both in the homo-polymer and copolymer forms. Such polymers are prepared by polymerization of the epihalohydrin-containing monomeric material in mass or in solution with organo-metallic catalysts such as the hydrocarbon-aluminium or hydrocarbonzinc catalysts. For use in the present invention, copolymers of an epihalohydrin with an alkylene oxide such as ethylene oxide are particularly preferred. Other epoxide monomers which may be copolymerized with an epihalohydrin monomer to produce copolymers useful in the present invention include propylene oxide, butene oxide, butadiene monoxide, cyclohexene oxide, vinycyclohexene oxide, and epoxy ethers such as ethylglycidyl ether, 2-chloroethylglycidyl ether, and allylglycidyl ether. The preferred polymers for use in the present invention are copolymers of epichlorohydrin containing from about 1 to about 40 percent by weight of ethylene oxide, such as, for example Hydrin 200 manufactured by B. F. Goodrich Chemical Company in which the combined ethylene oxide content is about 35 percent by weight. The epihalohydrin polymers may be used together with one or more other polymers.

Tackifiers for use in the compositions of the invention desirably have a melting point of at least 75° C., but usually not more than 160° C. The melting point of the tackifier preferably lies in the range of from 80° C. to 110° C.

Suitable tackifiers include especially those containing polar moieties compatible with the epihalohydrin polymer so that they form a homogenous blend therewith at elevated temperature. Amongst such polar moities there may be mentioned, for example, hydroxyl, carbonyl or ether groups, or halogen atoms such as chlorine. A preferred group of tackifiers is the phenolic resins, especially modified alkyl phenolic resins containing either linkages, such as, for example, Necires DF 85, DF 100 and DF 115 manufactured by Neville-Cindu (Holland). These resins may be broadly described as modified alkyl aromatic polymers, containing oxygen in ether bridges and phenolic hydroxyl groups, and having the empirical formula $C_7H_8O_{1/2}$. Other phenolic resins may also be suitable, particularly those having a ratio of ether bridges to hydroxyl groups of from 2:1 to 1:2, for example about 1:1.

Although less preferred, there may also be used as tackifiers coumarone-indene resins derived from coumarone oil, which is an unsaturated coal tar fraction having a boiling point of approximately 150° C. to 200° C. Coumarone oil contains, dissolved in benzene hydrocarbons, compounds such as indene, coumarone, styrene, methyl styrene, methyl indene and methyl coumarone. Suitable coumarone-indene resins include those manufactured by Neville-Cindu under the trade name Necires RF 85 and Necires RF 100.

Compositions according to the present invention incorporating the above tackifiers may have excellent resistance to water absorption, and the preferred compositions have been found to have a water absorption of less than 5 percent by weight at ambient temperature for one month.

Where outstanding resistance to water penetration is not required it is possible to replace the phenolic resin or the coumarone-indene resin ether wholly or partly with a thermoplastic polyketone resin. Amongst these there may be mentioned in particular the condensation products of aliphatic ketones having a total of 3 to 6 carbon atoms, for example acetone, methylethylketone, and 3-hexanone. The polyketone resin may also contain a minor proportion of a monoarylalkylketone having from 6 to 10 ring carbon atoms in the aryl group and from 1 to 4 carbon atoms in the alkyl group, for example acetophenone, propiophenone, butyrophenone, valerophenone, and 1-butyronaphthone; or a minor proportion of a carbocyclic ketone having 3 to 7 ring carbon atoms, for example cyclopropane, cyclohexanone and cycloheptanone. Suitable condensation products of the above mentioned ketones are their condensation products with lower aliphatic aldehydes having from 1 to 4 carbon atoms, for example formaldehyde and acetaldehyde. The preferred thermoplastic polyketone resins are the condensation products of methylethylketone and formaldehyde, optionally together with a minor proportion of cyclohexanone.

Other polyketone resins which may be used include the cyclohexanone/formaldehyde condensation resins.

A wide variety of materials may be used as particulate fillers in the compositions of the invention. The precise nature of the filler will depend to some extent upon the tackifier and the application for which the composition is intended. The filler may be chosen from inorganic materials such as silica and metal oxides, for example alumina, iron oxides, e.g., ferric oxide, and antimony oxide; hydrated silica, hydrated metal oxides, for example hydrates of alumina; silicates, for example talc and mica; metal powders such as silver or aluminium powder; carbon black; and mixtures of any two or more of said materials. The surface area of the particulate fillers preferably lies within the range of from 1 to 500 $m^2$/gm.

Amongst preferred particulate fillers, there may be mentioned hydrated alumina, ferric oxide, and carbon black; $\beta$-alumina trihydrate being especially preferred.

Preferably the compositions of the present invention comprise 100 parts by weight of the elastomeric epihalohydrin polymer, from 25 to 75 parts by weight of the tackifier, and from 30 to 100 parts by weight of particulate filler.

It has been found that the bond strength and water resistance of the compositions of the invention may be improved by curing and accordingly in certain compositions there is included a minor proportion of a curing system. A particularly preferred curing system comprises (i) a thioalkanoic acid or its metal salts, such as thiodipropionic acid, methylenebisthiopropionic acid, thiodiacetic acid, and mercaptoacetic acid, or the corresponding sodium or lead salts such as lead (II) 3,3-thiodipropionate, and (ii) a tertiary amine such as 1,4-diazo-(2,2,2)-bicyclooctane. When the acid form of ingredient (i) is used it is necessary to add a metal based compound such as, for example, an alkali metal carboxylate or lead oxide.

Such curing systems are described in U.S. Pat. No. 3,732,174, the disclosure of which is incorporated herein by reference. Other, less preferred, curing systems are described in U.S. Pat. Nos. 3,026,270, 3,026,305, 3,341,491 and 3,414,529, the disclosures of which are also incorporated herein by reference. It is usually only necessary that the curing system be present in a minor amount, for example, from 0.5 to 5 parts by weight per 100 parts by weight of the epihalohydrin polymer.

The compositions according to the present invention may also contain minor amounts, for example up to about 10 percent and preferably not more than 5 percent by weight, based on the total weight of the composition, of other additives such as, for example, antioxidants, UV stabilizers, flame retardants, fungicides and pigments.

The compositions of the present invention may be formulated as a mastic, by omission of the curing system and reducing the amount of particulate filler present, or as a coatable liquid by the addition of an appropriate organic solvent, for example methylethylketone or 1,1,1-trichloroethane. Alternatively the compositions, containing higher amounts of filler, may be coated on to a substrate to form an adhesive or sealant coating having a substantially tack-free surface at ambient temperatures.

The compositions of the present invention may find application for use in heat-recoverable terminations and splices in mass impregnated paper insulated oil-filled cables, both of the draining oil and non-draining oil/resin variety, and for heat-recoverable terminations and splices for heating tapes and other conductors having jacket materials formed from difficultly-bondable substrates. It will be appreciated that, in such applications, they may also act to provide stress relief, as described above.

The following Examples illustrate the invention.

In the Examples, the formulations were prepared by mixing in a Winkworth Z-blade mixer for from 1 to 2 hours and then pressing the hot compositions into sheets having a thickness of 40 thousandths of an inch.

The peel strengths of the adhesive compositions were measured by two methods, as follows:

1. T-peel method

Samples measuring 1 inch × 3 inch were degreased by wiping with a "Kimwipe" paper cloth saturated with methylethylketone. Unless otherwise stated, the bond was prepared by sandwiching a 1-inch square film of the adhesive between the ends of a pair of substrates and then applying a 5-pound preheated weight to the bonding area and heating in an oven for 20 minutes at 150° C.

Peel strength was measured after 24 hours on a Monsanto Tensometer at a jaw separation rate of 2 inches per minute and the average value recorded. Figures quoted are the average of three samples.

Rolling Drum Peel Method

One-inch long substrate tubes having an outer diameter of 1 inch were degreased with methylethylketone as described above. The adhesive was then wrapped around the tube with a ½ inch width protected by Sellotape positioned above and below the adhesive at one point on the circumference. A heat-shrinkable tube of the other substrate was then placed over the adhesive and recovered in an oven for 20 minutes at 150° C.

Peel strength was measured after 24 hours by slitting the film of the second substrate in the vicinity of the Sellotape protected portion and pulling the resulting loose tab on a Monsanto Tensometer at a jaw separation rate of 2 inches per minute while restraining the tube of the first substrate so that it is free to rotate about its axis. The average value was recorded. The figures quoted are the average of three samples, the second substrate quoted being the tube.

EXAMPLE 1

The following formulations were prepared.

|  | 1 | 2 | 3 | 4 | 5 | 6 | 7 | 8 |
|---|---|---|---|---|---|---|---|---|
| Hydrin 200 | 200 | 200 | 200 | 200 | 200 | 200 | 200 | 200 |
| Polyketone resin | 140 | 140 | 140 | 140 | 100 | 50 | 100 | 100 |
| Alumina hydrate | 60 |  |  | 60 | 100 | 150 | 200 | 150 |
| Silver Flake FS2 |  | 120 |  |  |  |  |  |  |
| Vulcan P |  | 96 | 96 | 20 |  |  |  |  |
| Iron oxide powder |  |  |  |  | 20 | 20 | 20 | 20 |
| Lead (II) 3,3-thiodipropionate |  |  |  |  | 7 | 3.5 | 3.5 | 3.5 |
| 1,4-diazabicyclo-(2,2,2)-octane |  |  |  |  | 3 | 1.5 | 1.5 | 1.5 |
| Gramosol 76A (1,1,1-trichloroethane) |  | 260 | 655 |  |  |  |  |  |

Hydrin 200 is an epichlorohydrin/ethylene oxide copolymer containing about 35 percent by weight of ethylene oxide manufactured by the BF Goodrich Chemical Company.

The polyketone resin is a methylethylketone/formaldehyde condensation resin having a melting point of 85° to 90° C.

The alumina hydrate used is a β-alumina trihydrate having a surface area of 13–14 m²/g and a particle size of less than 3 microns.

Silver Flake FS2 is a silver powder manufactured by Johnson Mathey Ltd.

Vulcan P is a carbon black manufactured by Cabot Corporation.

The various formulations were then tested as described below.

Formulation 1

This formulation was made up into a mastic tape suitable for use in splicing mass impregnated non-draining oil! filled cables. The results of the rolling drum peel strength tests were as follows:

| Ethylene-propylene rubber/copper | 9 lbs/in cohesive failure |
| --- | --- |
| Ethylene-propylene rubber/stainless steel | 4 lbs/in cohesive failure |
| Rolling drum peel strength after 3 days immersed in cable oil at 80° C. | |
| Ethylene-propylene rubber/copper | 7 lbs/in cohesive failure |

The electrical properties of the formulation were as follows:

| Electrical strength | 4KV/mm |
| --- | --- |
| Permittivity | 5.5 |
| Tan Δ | 0.0536 |

Formulation 2

This formulation was made up into an electrically conductive black mastic suitable for use in splicing mass impregnated non-draining oil-filled cables. Rolling drum peel strength:

| Ethylene-propylene rubber/ ethylene-propylene rubber 20° C. | 7 lbs/in cohesive failure |
| --- | --- |
| Ethylene-propylene rubber/ ethylene-propylene rubber 50° C. | 2 lbs/in cohesive failure |
| The electrical properties of the formulation were as follows: | |
| Volume resistance | $10^3$ ohm cm after ageing 1 hour at 80° C. Approx. $10^6$ ohm cm before heat ageing. |

Formulation 3

This formulation was also made up into a black mastic having a lower viscosity and lower conductivity than formulation 2.

Formulation 4

This formulation was made up into a black mastic tape suitable for use as an adhesive for a heat-recoverable pipe repair sleeve. Rolling drum peel strength:

| Polyethylene/polyethylene | 18.6 kg/25 mm, cohesive failure |
| --- | --- |
| Polyethylene/steel | 6.0 kg/25 mm, cohesive failure |
| Polyethylene/lead | 10.5 kg/25 mm, cohesive failure |
| Specific gravity, ASTM D792, BS2782-509A | 1.21 |
| Viscosity at 160° C., ASTM D1084 | Too high to measure |
| Dielectric strength | 96 KV/cm |
| Volume resistivity | $9.6 \times 10^9$ ohm cm |
| Water absorption, ASTM D570 | 10.8% |
| Solvent resistance, ASTM D543 weight change (%) after immersion in fluids in accordance with | |
| MIL-H-5606 (Univis - petroleum based hydraulic oil) | −0.33% |
| MIL-L-7808G (synthetic sebacate lube oil) | −0.65% |
| ASTM No. 1 oil (petroleum based) | +0.7% |

Corrosive effect, 16 hours 121° C., ASTM D2671 non-corrosive.

Formulation 5

This formulation was made up into a curable adhesive which may be used to bond an aluminum substrate to polyethylene.

| Rolling drum strength: | |
| --- | --- |
| Polyethylene/aluminum | 34 lbs/in |
| Polyethylene/lead | 47 lbs/in |
| T-peel bond strength: | |
| Polyethylene/aluminum 20° C. | 23 lbs/in cohesive failure |
| Polyethylene/aluminum 150° C. | 0.3 lbs/in failure at polyethylene |

Formulation 6

This formulation was made up into a red, curable adhesive tape suitable for bonding Tefzel to other substrates. In an experiment, a conductor having a Tefzel insulating jacket was terminated by wrapping the adhesive tape around the jacket material, recovering thereon Raychem RNF 100 heat shrinkable polyolefin tubing (Raychem is a Registered Trademark) or heat-shrinkable polyvinylidene fluoride tubing and heating until the adhesive flowed. Bonds with a peel strength of 10–15 pounds/inch with predominantly cohesive failure were obtained. By comparison, adhesives based on silicones, polyvinylidene fluoride, polyamides and ethylene-vinyl acetate copolymers gave peel strengths of less than 1 pound/inch, failing at the Tefzel surface.

Formulations 7 and 8

These formulations were made up into curable adhesives red in color, with good adhesion to high voltage silicone containing polymeric insulation materials. Formulation 8 has a rolling drum peel strength as follows:

| Silicone H.V. insulation material/ silicone H.V. insulation material | 30 lbs/inch |
| --- | --- |
| Silicone H.V. insulation material/ copper | 37 lbs/inch |
| Polyethylene/aluminum | 26 lbs/inch |
| Polyethylene/lead | 33 lbs/inch |

The silicone high voltage insulation material used in the above test was a material according to Example 1 of British Pat. No. 1,337,951.

EXAMPLE 2

Formulations containing 200 parts by weight of an elastomer, 140 parts by weight of a polyketone resin (methylethylketone/formaldehyde condensation resin MP 85° C.), 60 parts by weight of β-alumina trihydrate (surface area 13–14 m²/g, particle size less than 3 microns, and 20 parts by weight of carbon black (Vulcan P) were prepared as described above.

The elastomers used were as follows:
A—Hydrin 200 (epichlorohydrin—ethylene oxide copolymer)
B—Neoprene WRT (polychloroprene)
C—Hypalon 45 (chlorosulphonated polyethylene)

The percentage weight change of the adhesive formulation after immersion in various solvents at room temperature for 24 hours was measured with the following results:

|  | A | B | C |
|---|---|---|---|
| Water | +10.8 | +0.8 | +0.5 |
| MIL-H-5606 (Univis) | −0.33 | +6.0 | +6.8 |
| MIL-L-7808G (Lubricating Oil) | −0.65 | Dissolved | +19.0 |
| ASTM Oil No. 1 | +0.7 | +1.88 | +1.31 |
| Rolling drum peel strength test results (pounds/inch): | | | |
| Crosslinked polyethylene/aluminum | 11.7 | 2.3 | 0 |

These results show the considerable improvement in oil resistance and peel strength obtained with the epichlorohydrin polymer based adhesive compositions of the invention by comparison with adhesives based on other elastomers.

EXAMPLE 3

The procedure of Example 2 was repeated using Hydrin 200 as the elastomer and a number of polar tackifiers as follows:

| A Necires RF 85 | (coumarone-indene resin manufactured by Neville-Cindu) |
|---|---|
| B Necires RF 100 | (coumarone-indene resin manufactured by Neville Cindu) |
| C Necires DF, 100 | (alkyl phenolic resin manufactured by Neville-Cindu) |
| D Krumbhaar K1717B | (cyclohexanone-formaldehyde resin manufactured by Lawter Chemicals Ltd.) |

Solvent resistance and rolling drum peel strength tests were carried out as described above with the following results:

| Water | +4.6 | +4.2 | +1.5 | +4.99 |
|---|---|---|---|---|
| Univis | −1.22 | −0.31 | −0.35 | 0.0 |
| MIL-L-7808G | +1.2 | +1.6 | +1.1 | −0.6 |
| ASTM Oil No. 1 | −0.28 | −0.31 | 0.0 | +0.16 |
| Peel strength polyolefin/aluminum (pounds/inch) | 6.0 | 4.8 | 27.8 | 19.7 |

These results show the excellent oil resistance and peel strength obtained with the adhesive compositions of the present invention.

The figures in the table above refer to a percent weight change after immersion at R.T. for 24 hours.

EXAMPLE 4

Various formulations (including some from the previous Examples) were tested to compare the effect of different tackifiers.

The formulations consisted of 200 parts by weight Hydrin 200, 60 parts by weight Lunafil B ($\beta$-alumina trihydrate), 20 parts by weight Vulcan P and 140 parts by weight of the tackifier.

The results obtained are set out in Table 1. The tackifiers used are as follows:

| PK resin | (a methylethylketone/formaldehyde resin) |
|---|---|
| K1717 | (an unsaturated cyclohexanone-formaldehyde resin ex Lawter Chemicals Ltd.) |
| Resin AFS | (a cyclohexanone-formaldehyde resin ex Bayer) |
| Necires RF85 | (a coumarone-indene resin ex Neville-Cindu) |
| Necires RF100 | (a coumarone-indene resin ex Neville-Cindu) |
| Necires DF100 | (an alkyl-phenolic resin ex Neville-Cindu) |
| K1717B | (a saturated cyclohexanone-formaldehyde resin ex Lawter Chemicals Ltd.) |
| Kunstharz AP | (an acetophenone-formaldehyde resin ex Huls U.K. Ltd.) |
| K254 | (a phenylphenol-formaldehyde resin ex Huls U.K. Ltd.) |
| CK1634 | (a phenolic resin ex BXL Ltd.) |
| R17301 | (a phenolic resin ex BXL Ltd.) |

The results indicate the general superiority, insofar as adhesion is concerned, of phenolic and modified phenolic tackifiers.

TABLE 1

| Tackifier | m.p. °C. | Absorption After 1 Day at Room Temperature Percent Weight Change | | | | Rolling Drum Peel Strength RNF/Aluminum lbs/in |
|---|---|---|---|---|---|---|
| | | Water | Univis | 7808G | ASTM No. 1 | |
| PK Resin | c. 90 | +10.8 | −0.3 | −0.6 | +0.5 | 11.7 cohesive failure |
| K 1717 | 100 | +16.3 | −18.9 | −27.3 | −23.6 | 18.8 cohesive failure |
| Resin AFS | 85 | +10.9 | −20.5 | −18.4 | −16.8 | 26.5 cohesive failure |
| Necires RF85 | 85 | +4.6 | −1.2 | −1.2 | −0.3 | 6.0 cohesive failure |
| Necires RF100 | 100 | +4.2 | −0.3 | +1.6 | −0.3 | 4.8 cohesive failure |
| Necires DF100 | 100 | +2.0 | −0.4 | +1.1 | 0 | 27.8 cohesive failure |
| K1717B | 100 | +5.0 | 0 | −0.6 | +0.2 | 19.7 cohesive failure |
| Kunstharz AP | 80 | +1.9 | −0.1 | +0.9 | +0.2 | 13.3 cohesive and aluminum/adhesive interface failure |
| K254 | 100 | +1.1 | +0.1 | +0.1 | +0.2 | 16.2 aluminum/adhesive interface failure |
| CK 1634 | c..100 | +2.0 | +0.0 | +2.1 | +0.3 | 31.0 cohesive failure |
| R17301 | 110 | +9.3 | +18.7 | +16.2 | +3.8 | 9.0 cohesive failure |

EXAMPLE 5

This Example illustrates the use of two different tackifiers with two different epihalohydrin polymers. The formulations and the results obtained were as follows:

| Hydrin 200 | 200 | 200 | — | — | 100 | 100 | 200 |
|---|---|---|---|---|---|---|---|
| Hydrin 100 | — | — | 200 | 200 | 100 | 100 | — |
| PK resin | 140 | — | 140 | — | 140 | — | 50 |
| Necires DF 100 | — | 140 | — | 140 | — | 140 | — |
| Lunafil B | 60 | 60 | 60 | 60 | 60 | 60 | 150 |
| Vulcan P | — | — | 20 | — | — | — | — |
| RB 35074 | 20 | 20 | — | 20 | 20 | 20 | 20 |
| Lead thiodipropionate | — | — | — | — | — | — | 3.5 |
| Diazobicyclooctane | — | — | — | — | — | — | 1.5 |
| Oil Uptake % by Weight 1 day | | | | | | | |
| MIL-H-5606 | −0.5 | −0.5 | −0.1 | −0.1 | −0.1 | −0.3 | −0.1 |
| MIL-L-78-8G | −2.0 | +1.5 | * | +30 | * | +30.6 | +1.2 |

| | | | | | | | |
|---|---|---|---|---|---|---|---|
| ASTM No. 1 | +0.1 | +0.5 | +0.1 | +0.1 | +1.1 | +0.8 | +0.5 |

*Not possible to measure because absorption so high.

| Water Uptake % by Weight | | | | | | | |
|---|---|---|---|---|---|---|---|
| 1 Day | +6.0 | +5.0 | +0.3 | +0.3 | +1.1 | +0.8 | +23.2 |
| 7 Days | +15.0 | +24.0 | +0.9 | +0.9 | +2.7 | +2.1 | — |
| T-Peel Strength lbs/in | | | | | | | |
| (a) 2 thousandths Tefzel film | 0.8(a) | 4.5(b) | 0(a) | 0(a) | 2.0(b) | 0(a) | 0.75(a) |
| (b) 10 thousandths Kynar film | 1.2(b) | 16.8(b) | 2.2(a) | 4.2(a) | 11.2(b) | 9.2(a) | 9.2(a) |

(a) adhesive/substrate failure
(b) cohesive failure

It will be seen that the results for formulations containing Hydrin 200, which is a copolymer, indicate better adhesion to Tefzel and other substrates than those containing Hydrin 100, which is a pure epichlorohydrin homopolymer. However, although the Hydrin 100 formulations show inferior synthetic lubricating oil absorption properties, which is relatively unimportant, they show superior water resistance.

By comparison, a series of conventional adhesives showed negligible peel strength to Tefzel, apart from two based on butyl rubber and tackified styrene-butadiene block copolymers, which, however, had extremely bad oil absorption characteristics.

EXAMPLE 6

The following formulations and test results illustrate the use of various polymers including blends of epihalohydrin polymers with themselves and other polymers.

| Formulation | Parts by Weight | | | | | |
|---|---|---|---|---|---|---|
| Hydrin 200 | 100 | 100 | 100 | 0 | 200 | 100 |
| Hypalon 45 | — | 100 | — | — | — | — |
| Royalene 522 | — | 100 | — | — | — | — |
| Cariflex TR 1107 | — | — | 100 | — | — | — |
| Neoprene WRT | — | — | — | 200 | — | — |
| Hydrin 100 | — | — | — | — | — | 100 |
| PK Resin | 140 | 140 | 140 | 140 | 140 | 140 |
| Lunafil B | 60 | 60 | 60 | 60 | 60 | 60 |
| Vulcan P | 20 | 20 | 20 | 20 | — | — |
| RB 35074 | — | — | — | — | 20 | 20 |
| Oil Uptake | | | | | | |
| MIL 5606 | +2.9 | +13.2 | +31.4 | +6.0 | −0.5 | −0.1 |
| MIL 7808 | +17.0 | +3.2 | +13.0 | dissolved | −2.0 | almost dissolved |
| ASTM No. 1 | +1.0 | +9.0 | +4.5 | +1.9 | +0.1 | +1.1 |
| Water Uptake | | | | | | |
| 1 Day | +2.4 | +3.4 | +4.5 | +0.8 | +6.0 | +1.1 |
| 7 Days | +7.3 | +19.7 | +22.2 | — | +15.0 | +2.7 |
| Rolling drum Peel strength | 3.2(a) | 20(b) | 11.2(a) | 2.3(a) | 11.7(b) | 26.8(b) |

RNF/aluminium (a) failure at adhesive/aluminium interface
lbs/inch (b) cohesive failure of adhesive
Hypalon 45 is a chlorosulphonated polyethylene
Royalene 522 is an ethylene/propylene/butadiene elastomer
Cariflex TR 1107 is a styrene-isoprene block copolymer
RB 35074 is $Fe_2O_3$.

It will be seen that the formulations in accordance with the present invention show generally superior oil-resistance and peel strength compared to the formulation based on neoprene alone and that the blends of Hydrin 200 with Royalene and of Hydrin 200 and Hydrin 100 show especially good peel strength.

We claim:

1. A method of providing relief against electrical stress in a region liable to be affected which comprises filling any voids in said region with a composition comprising:
   (a) 100 parts by weight of an elastomeric epihalohydrin polymer comprising recurring units having the formula:

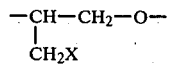

where X is a halogen atom;
   (b) from 12 to 125 parts by weight of a tackifier; and
   (c) from 25 to 150 parts by weight of a particulate filler.

2. A method as in claim 1, wherein the region is around a splice or termination in a high voltage cable.

3. A method as in claim 2, wherein the high voltage cable is a mass impregnated oil-filled cable.

4. A method as in claim 2, wherein the cable is a screened cross-linked polyolefin insulated high voltage cable.

5. A method as in claim 1, wherein the region is in an electrical apparatus subject to high voltage stress.

6. A method as in claim 1, wherein the composition comprises from 30 to 100 parts by weight of a particulate filler.

7. A method as in claim 1, wherein the particulate filler is selected from the group consisting of silica, metal oxides, hydrated silica, hydrated metal oxides, silicates, metal powders, carbon black, and mixtures thereof.

8. A method as in claim 1, wherein the particulate filler comprises a compound selected from the group consisting of silica, metal oxides, hydrated silica, and hydrated metal oxides.

9. A method as in claim 8, wherein the particulate filler comprises β-alumina trihydrate.

10. A method as in claim 1, wherein the process of filling said voids comprises:
 (a) applying said composition to at least a part of a surface of a heat-recoverable article; and
 (b) recovering said article such that said voids are filled by said composition.

11. An electrical apparatus subject to high voltage stress having voids in a region liable to be affected by electrical stress filled with a composition which provides relief against said electrical stress, said composition comprising:
 (a) 100 parts by weight of an elastomeric epihalohydrin polymer comprising recurring units having the formula:

$$-\mathrm{CH}-\mathrm{CH_2}-\mathrm{O}-$$
$$\phantom{-\mathrm{CH}-}|$$
$$\phantom{-\mathrm{CH}-}\mathrm{CH_2X}$$

where X is a halogen atom;
 (b) from 12 to 125 parts by weight of a tackifier; and
 (c) from 25 to 150 parts by weight of a particulate filler.

12. An apparatus as in claim 11, wherein the composition comprises from 30 to 100 parts by weight of a particulate filler.

13. An apparatus as in claim 11, wherein the particulate filler is selected from the group consisting of silica, metal oxides, hydrated silica, hydrated metal oxides, silicates, metal powders, carbon black, and mixtures thereof.

14. An apparatus as in claim 11, wherein the particulate filler comprises a compound selected from the group consisting of silica, metal oxides, hydrated silica, and hydrated metal oxides.

15. An apparatus as in claim 14, wherein the particulate filler comprises β-alumina trihydrate.

16. An apparatus as in claim 11, wherein said voids have been filled by the process of:
 (a) applying said composition to at least a part of a surface of a heat-recoverable article; and
 (b) recovering said article such that said voids are filled by said composition.

17. A high voltage cable having voids in a region liable to be affected by electrical stress filled with a composition which provides relief against said electrical stress, said composition comprising:
 (a) 100 parts by weight of an elastomeric epihalohydrin polymer comprising recurring units having the formula:

$$-\mathrm{CH}-\mathrm{CH_2}-\mathrm{O}-$$
$$\phantom{-\mathrm{CH}-}|$$
$$\phantom{-\mathrm{CH}-}\mathrm{CH_2X}$$

where X is a halogen atom;
 (b) from 12 to 125 parts by weight of a tackifier; and
 (c) from 25 to 150 parts by weight of a particulate filler.

18. A cable as in claim 17, wherein the composition comprises from 30 to 100 parts by weight of a particulate filler.

19. A cable as in claim 17, wherein the particulate filler is selected from the group consisting of silica, metal oxides, hydrated silica, hydrated metal oxides, silicates, metal powders, carbon black, and mixtures thereof.

20. A cable as in claim 17, wherein the particulate filler comprises a compound selected from the group consisting of silica, metal oxides, hydrated silica, and hydrated metal oxides.

21. A cable as in claim 20, wherein the particulate filler comprises β-alumina trihydrate.

22. A cable as in claim 17, wherein said voids have been filled by the process of:
 (a) applying said composition to at least a part of a surface of a heat-recoverable article; and
 (b) recovering said article such that said voids are filled by said composition.

* * * * *